Dec. 23, 1947.  S. L. CASELLA  2,433,027
LATHE
Filed Dec. 26, 1944  6 Sheets-Sheet 1

Fig. 1.

INVENTOR.
SECONDO L. CASELLA
BY
J. B. Felshin
ATTORNEY

Dec. 23, 1947.  S. L. CASELLA  2,433,027
LATHE
Filed Dec. 26, 1944  6 Sheets-Sheet 2

INVENTOR.
SECONDO L. CASELLA
BY
*J. B. Felshin*
ATTORNEY

Dec. 23, 1947.  S. L. CASELLA  2,433,027
LATHE
Filed Dec. 26, 1944  6 Sheets-Sheet 4

INVENTOR.
SECONDO L. CASELLA
BY
J. B. Felshin
ATTORNEY

Dec. 23, 1947.  S. L. CASELLA  2,433,027
LATHE
Filed Dec. 26, 1944  6 Sheets-Sheet 5

INVENTOR.
SECONDO L. CASELLA
BY
J. B. Felshin
ATTORNEY

Patented Dec. 23, 1947

2,433,027

UNITED STATES PATENT OFFICE 2,433,027

LATHE

Secondo L. Casella, New York, N. Y., assignor to Morey Machinery Co., Inc., New York, N. Y., a corporation Application December 26, 1944, Serial No. 569,695

12 Claims. (Cl. 82—14)

1

This invention relates to lathes. It is particularly directed to a semi-automatic lathe provided with a longitudinally movable carriage on which are mounted cutting tools movable toward the stock for turning the same, and controlled by cam means conforming to the shape of the turned piece of stock.

In lathes of the above-mentioned type, as heretofore constructed, the tool holder or slide was moved directly toward and into contact with the stock until stopped by the form cam. Difficulty has been experienced with such construction because of breakage of the cutting tool due to impact of the tool with the stock. It is therefore an object of the present invention to obviate such difficulty by providing in a lathe of the character described, means to cause the cutting tip of the tool to approach the stock at an inclination to the axis of the stock instead of at right angles to said axis as in prior machines.

Another object of this invention is to provide in a lathe of the character described, a plurality of spaced cutters, a form cam to limit inward movement of the cutters toward the stock, and an approach cam having an inclined cam portion controlling each cutter as it approaches the form cam.

Still another object of this invention is to provide in a lathe of the character described, an approach cam longitudinally movable with the carriage on which the tool cutters are mounted, after the tool cutters come under the control of the form cam, whereby each cutter may have a cutting travel longer than the distance between cutters, whereby the cutters cut overlapping portions of the stock and thereby permitting the use of a greater number of cutters.

Another object of this invention is to provide in a lathe of the character described, an approach cam having a plurality of cam projections, each having an inclined edge to cause the tool to approach the stock at an inclination, and said projections having aligned rear edges, and means to move the approach cam relative to the carriage to retract the tool holders and to bring said rear edge portions of the cam projections into engagement with aligned portions of the tool holders, whereby to insure perfect alignment of the tool holders, hence permitting accurate adjustment of the cutting tools.

Yet a further object of this invention is to provide in a lathe of the character described a carriage, a form cam and an approach cam coextensive therewith, said cams being disposed one above the other and mounted on the carriage, and

2 said carriage being movable relative to the form cam and approach cam, and the approach cam also being movable with the carriage, said cams having aligned straight rear edges, and a backing member for said cams comprising a plate supporting a plurality of rollers projecting from the plate and contacting the rear edges of the cams.

Still another object of this invention is to provide compact and durable apparatus of the character described which shall be relatively inexpensive to manufacture, which shall be sure and positive in operation, and yet practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown various possible illustrative embodiments of this invention.

Referring now in detail to the drawing, 10 designates a lathe embodying the invention. The same comprises generally of a base 11 and a headstock 12 fixed on one end of the base. Within the headstock 12 is a spindle 13 carrying an expanding arbor 13a. Mounted on the opposite end of the base is a tailstock 14. The arbor 13a is adapted to support for rotation a piece of stock 15 to be turned. On the tailstock is a quill 14a to engage one end of stock 15. On the headstock 12 is a motor 16 connected through suitable transmission to the spindle 13.

The base 11 is provided with a bed 20. Slidably mounted thereon for movement longitudinally of the lathe, is a front carriage 21. The front carriage 21 is formed with a vertical surface 22 from which there extends a horizontal surface or shoulder 23. The walls 22 and 23 extend in a direction longitudinally of the axis of the lathe. The front carriage is also formed with a plurality of parallel recesses 25, there being one recess for each tool holder 26 mounted on the carriage for sliding movement in a horizontal direction transverse to the axis of the lathe. Each recess 25 is open at the top and at the rear and has a bottom surface 25a and side surfaces 25b. At the upper end of each recess 25 are a pair of symmetrically disposed downwardly and outwardly inclined slide surfaces 26, 26a. Between the recesses 25 are top horizontal surfaces 27. It will be noted that the surfaces 22 and 23 form a longitudinal chamber 28 which communicates with the recesses 25. The walls 29 located between the recesses 25 have forward end vertical surfaces 30 and lower horizontal surfaces 30a forming front and bottom surfaces of chamber 28. Between surfaces 28 and 30a are shoulders 30b.

Each tool holder 26 comprises a slide 32 having a top wall 33 resting on surfaces 27 and a wall 34 of dove tail cross-section disposed between the slide surfaces 26, 26a. Extending downwardly from wall 34 is an arm 35 projecting into recess 25. Arm 35 is formed at its lower end with a ring 36. Said arm 35 is furthermore formed with a vertical semi-cylindrical surface 37; and ring 36 is formed with an annular through bearing opening 38 forming a continuation of the semi-cylindrical surface 37. The top wall 33 of slide 32 is formed with a through opening 38a aligned with opening 38 and likewise forming a continuation of surface 37. Contacting the underside of portion 35 of the slide and closing the bearing opening 38 is a bottom cap 40. Within the upper end of each opening 38a is a plug 40a having a flange at its upper end contacting the slide. The plug 40a may be formed with an annular groove 40b. Set screws 40c passing through threaded openings in the slide, project into grooves 40b of the plugs. Within each opening 38 is a bearing 41. Within each opening 38a and beneath plug 40a is a bearing 41a. Within each semi-circular opening 37 and between the bearings 41, 41a is a roller 42 having a vertical axis and projecting beyond the surface 37 for the purpose hereinafter appearing.

On slide 32 is a tool clamp 43 supporting either one or two cutting tools 44. To turn the piece of stock 15 on the arbor 13a, each clamp may be provided with suitable means to adjust the position of the cutting tools 44.

Figure 1:
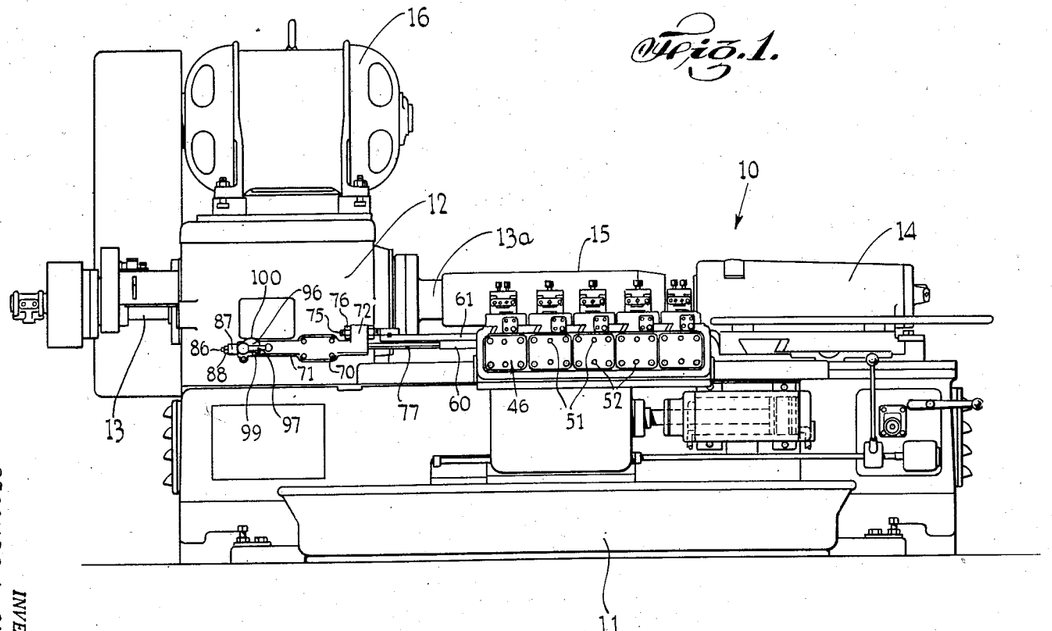
Fig. 1 is a front elevational view of a lathe embodying the invention.
Figures 2, 5:
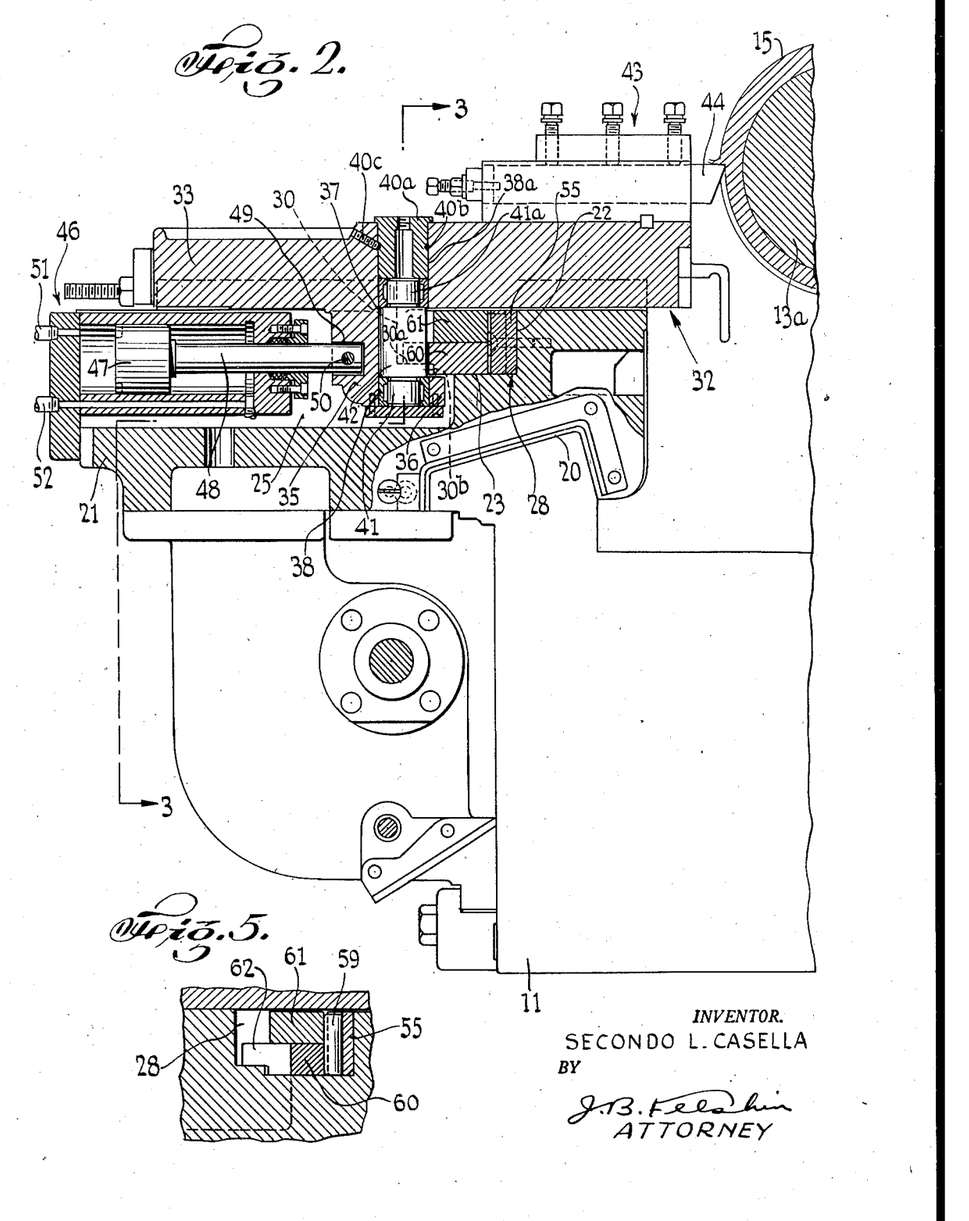
Fig. 2 is an elevational end view of a portion of the lathe with parts broken away and in cross-section.
Fig. 5 is a cross-sectional view taken on line 5—5 of Fig. 4.
Figure 3:
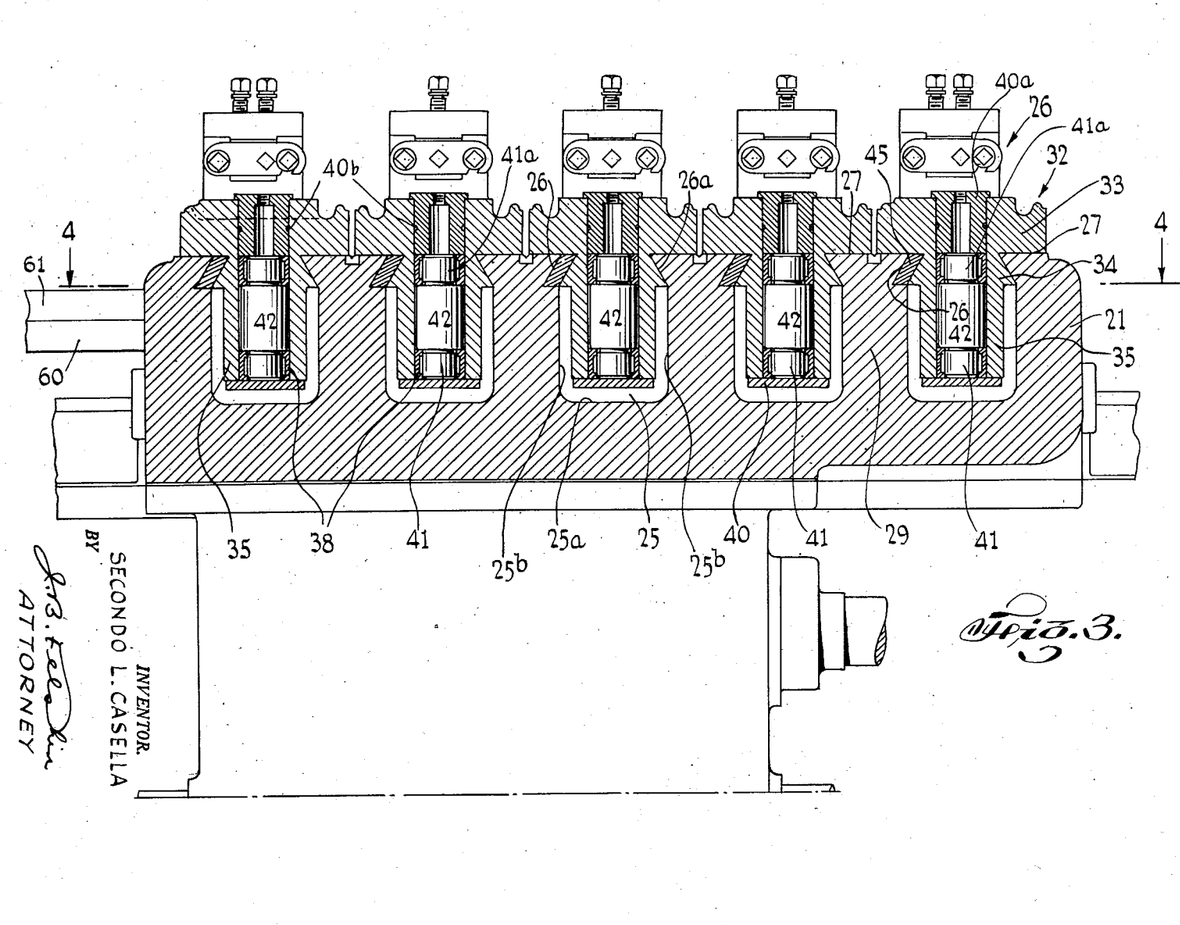
Fig. 3 is a cross-sectional view taken on line 3—3 of Fig. 2.

Interposed between portions 34 of each slide 32 and each surface 26 is a gib 45 as shown in Fig. 3 of the drawing.

Hydraulic means is provided to move each slide 32 toward and away from the axis of the spindle. To this end there is mounted on the front carriage 21 a hydraulic cylinder 46 for each slide projecting into one of the recesses 25.

Within each cylinder 46 is a piston 47 provided with a piston rod 48 fixed to an arm 35 of the slide. Arm 35 of each slide is formed with a recess 49 into which the forward end of piston rod projects. A pin 50 passes through the piston rod and arm 35 of the slide for attaching the rod to the slide. It will now be understood that when hydraulic medium is fed into cylinder 46 through passage 51 to the rear of the piston, the piston moves the slide toward the stock. When a hydraulic medium is fed into the cylinder through passage 52 to the opposite side of the cylinder, the slide is retracted for moving the cutting tool away from the stock.

Means is provided to control the turning of the stock as the front carriage moves longitudinally of the bed 20 toward the headstock. To this end there is mounted within chamber 28 and contacting surface 22 a longitudinally extending roller plate 55 which rests on surface 23. The roller plate 55 may be attached to the carriage by means of screws 56. Said roller plate is drilled with vertical, part-cylindrical aligned openings 57 which communicate with the front surface 58 of the roller plate. The openings 57 are preferably equally spaced apart and are similar and in alignment. Within each opening 57 is a vertical cylindrical roller 59 having a height equal to the height of the roller plate. The rollers 59 project forwardly beyond surface 58 of the roller plate 55 as shown in Fig. 4 of the drawing.

Within chamber 28 and resting on surface 23 and disposed in front of the roller plate 55 is an approach cam 60 having a lost motion connection with the carriage as will be described hereinafter. Resting on the approach cam and likewise disposed in chamber 28 and extending longitudinally of the carriage is a form cam 61 fixed to the headstock, as will be described hereinafter. The rear edges of the cams 60, 61 are straight and in alignment and contact the projecting portions of the rollers 59. The approach cam 60 is formed with a plurality of equally spaced cam projections 62. The projections 62 are spaced apart similarly to the spacing of recesses 25. There may be one projection for each slide except the one nearest to the tailstock. Each projection 62 has an inclined surface 63 and an end edge 64 extending longitudinally of the spindle; and an edge 65 extending at right angles to the spindle. The projections 62 extend outwardly beyond an inner edge 66 on the approach cam. At one end of the approach cam is a cutaway 67 forming an end abutment edge 68 for the purpose hereinafter appearing. The projections 62 project beyond the cam edge 61a of the form cam. The cam edge 61a conforms to the contour of the turned article, that is it has a shape conforming to a longitudinal section of the finished or turned article. It will be noted that the rollers 42 contact the edges 63 of the approach cam.

Figure 4:
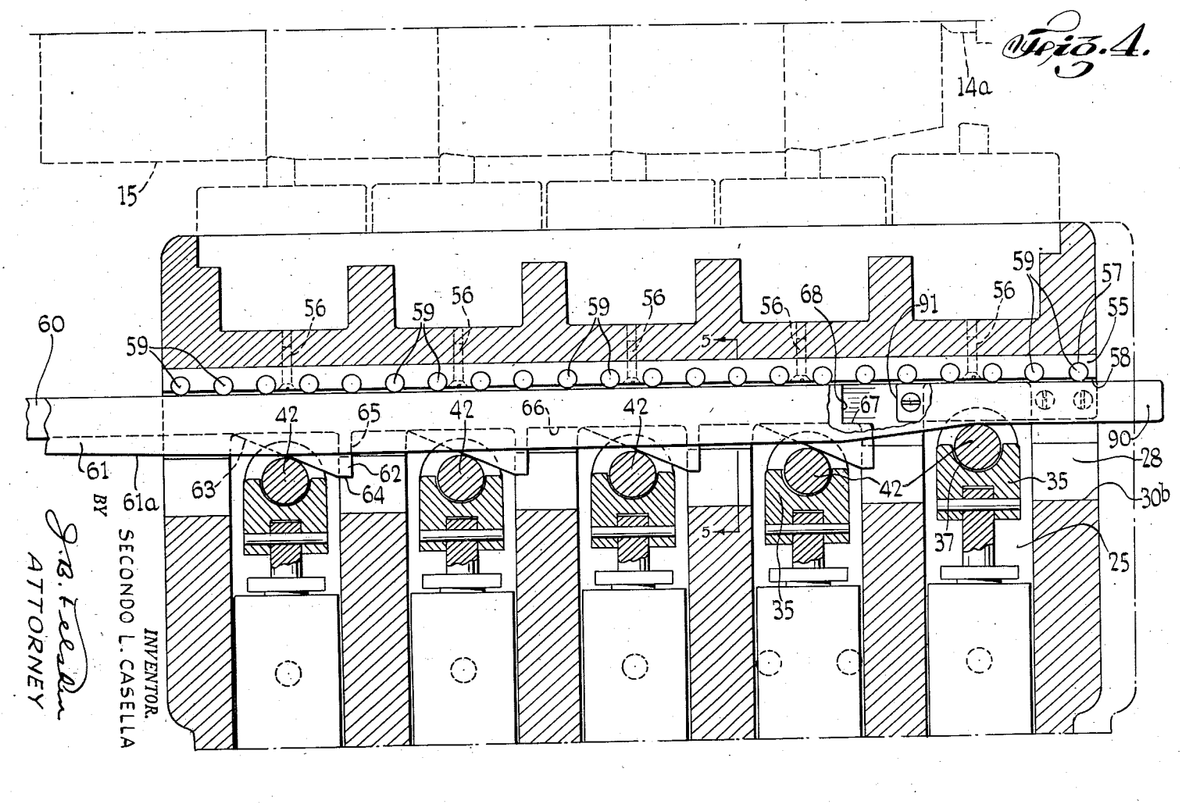
Fig. 4 is a cross-sectional view taken on line 4—4 of Fig. 3.

As the carriage moves to the left, looking at Fig. 4, the rollers will move from the inclined edges 63 onto the cam edge 61a of the form cam. Due to such action the cutting tools will approach the stock with a resultant movement at an inclination as the carriage is moved and not at right angles to the stock. In lathes of the general type herein described, as heretofore constructed, the rollers were moved directly against the form cam, thus bringing the cutting tool directly into the stock in the direction at right angles to the axis of the stock, and such action caused an impact which often broke the tool. With the present construction, due to the fact that the cutting tools approach the stock and start cutting at an inclination to the axis of the stock, impact is lessened thereby saving the tools.

Attached to the headstock 12 as by screws 70 is a horizontal, longitudinally extending tube 71. At one end of the tube 71 is an upwardly extending lug 72 formed with a longitudinal through opening 73. Fixed to one end of the form cam 61 as by screws 74 is a stud 75 passing through the opening 73. Nuts 76 screwed to the stud 75 and located on opposite sides of lug 72 serve to fix the stud to tube 71. The form cam is thus fixed to the headstock against longitudinal movement.

The approach cam 60 is slidable relative to the base. Attached to one end of the approach cam is a rod 77 which passes through the tube 71. Fixed to the rod 77 as by taper pin 78, is a collar 79 slidable within the tube. Tube 71 is formed at its left end with an internally screw threaded opening 80. Screwed to said screw threaded opening is a plug 81. Plug 81 is formed with a through opening 82 through which the rod 77 passes. Fixed to the rod as by taper pin 83 is a collar 84 contacting the outer end of plug 81. Interposed between plug 81 and collar 79 and disposed within the tube, is a coil compression spring 85 which normally urges the approach cam to normal position. Rod 77 is formed with a reduced stem 86 at one end. Mounted on the stem and contacting collar 84 is a finger 87. A nut 88 screwed to the outer screw threaded end of the stem serves to press the finger 87 against collar 84.

Means is provided on the carriage to move the approach cam to the left with the carriage, against the spring pressure of the spring 85 after the rollers 42 have moved off the cam lugs or projections 62 and onto the form cam, whereby to permit a total cutting movement of the carriage greater than the distance between lugs 62. To this end there is fixed to the carriage a bar 90 aligned with abutment edge 68. The left end 91 of the abutment bar is spaced from edge 68 of the approach cam. The distance between the edges 91 and 68 is sufficient to permit movement of the rollers onto the form cam. However, when edge 91 contacts edge 68 continued movement of the carriage will cause the approach cam to move therewith so that the rollers will not contact the next adjacent abutment 62. Thus the distance between arm 35 of one slide and edge 65 of the next adjacent lug 62 is greater than the distance between the edges 68 and 91 whereby to cause movement of the approach cam before arm 35 hits the next adjacent lug 62. With such construction, a plurality of cutters may be used and they may be spaced fairly close together and yet permit longer cuts for the tool on each tool holder. With such construction furthermore, the cutting tool of each tool holder cuts beyond the point of beginning of the cut of the next adjacent tool holder, so that the range of each tool overlaps the range of the next adjacent tool. The rollers 59 facilitate movement of the carriage relative to the cams 60, 61.

Figure 6:
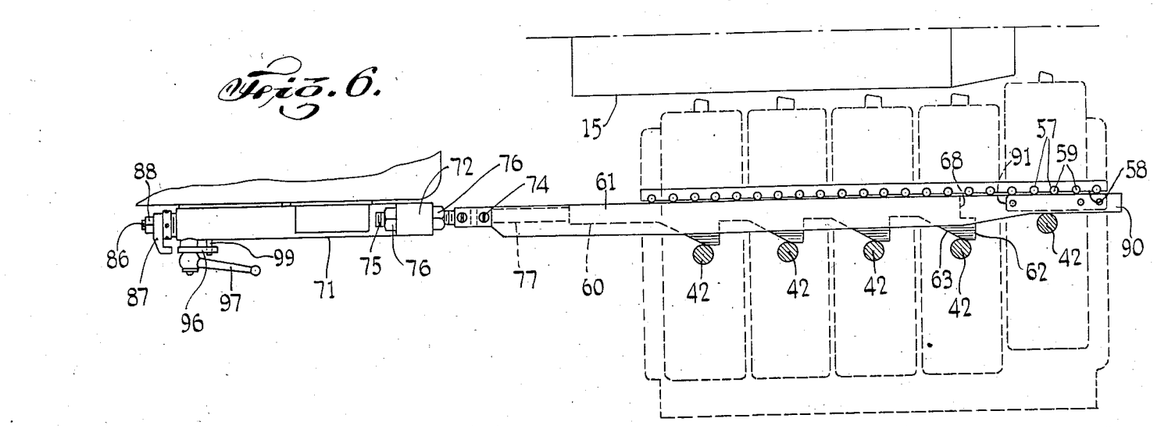
Fig. 6 is a top plan view of the form and approach cams together with their controls.
Figure 7:
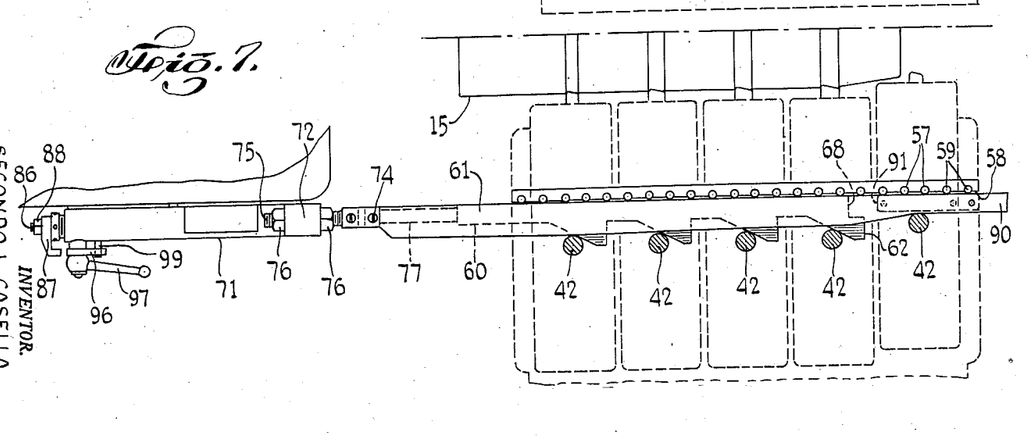
Fig. 7 is a view similar to Fig. 6 but showing the carriage moved from the position shown in Fig. 6, but with the tool holder still under the control of the approach cam.

In Fig. 6 the rollers 42 are shown in engagement with edges 63 of the lug 62 of the approach. Fig. 7 shows the position of the carriage moved further to the left and with the rollers approaching close to the form cam.

Figure 8:
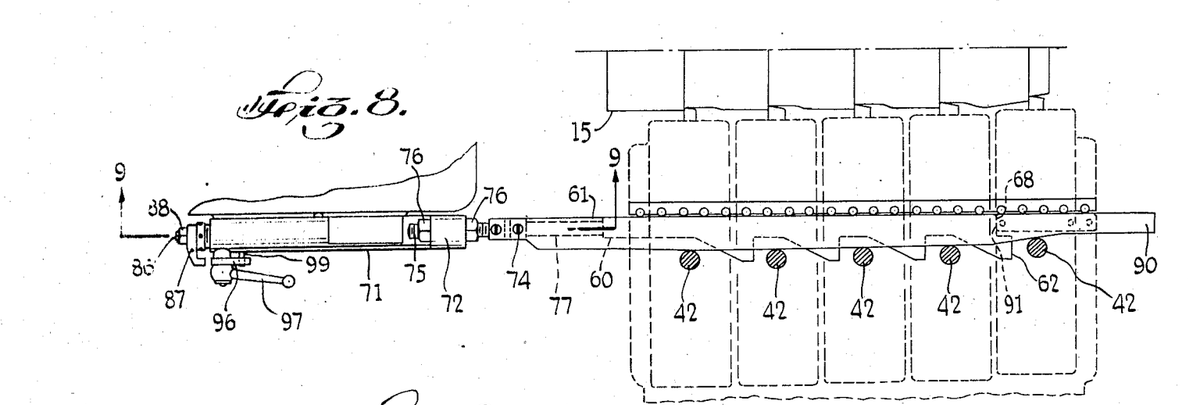
Fig. 8 is a view similar to Fig. 7 and showing the carriage moved still further, and with the tool holder under the control of the form cam.
Figure 9:
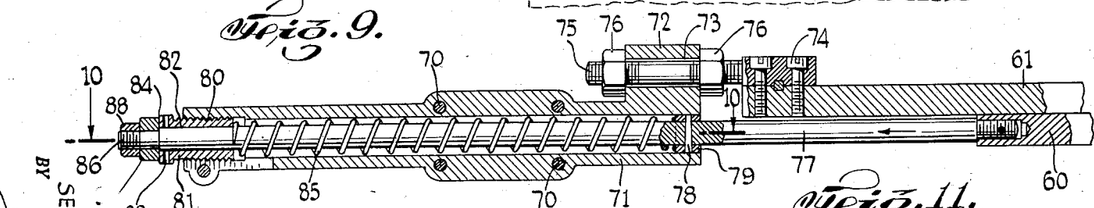
Fig. 9 is a cross-sectional view taken on line 9—9 of Fig. 8.
Figure 10:
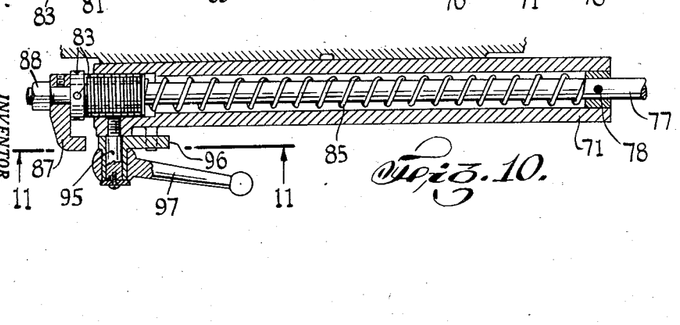
Fig. 10 is a cross-sectional view taken on line 10—10 of Fig. 9.

In Fig. 8 the rollers contact the form cam, having moved away from the lugs 62. Furthermore, as shown in Fig. 8, edge 91 of bar 90 has contacted edge 68 of the approach cam so that further movement of the carriage will cause sliding movement of the approach cam therewith.

Figure 11:
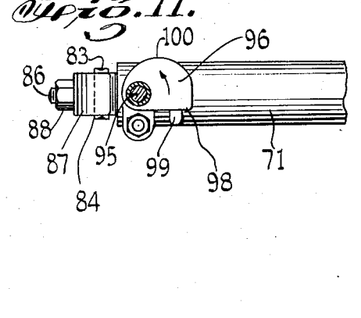
Fig. 11 is a cross-sectional view taken on line 11—11 of Fig. 10.

Means is provided to cause all of the rollers to contact the edges 64 of the lugs 62, to facilitate adjustment of the cutting tools. To this end there is screwed to one end of tube 71, a horizontal pin 95. Rotatably mounted on the pin is a cam 96. Fixed to the cam is a spindle 97. The cam 96 has a straight edge 98 adapted to contact a fixed pin 99 projecting from tube 71, as shown in Fig. 11 of the drawing. The cam 96 furthermore is formed with a substantially spiral cam surface or edge 100. Upon rotating the handle, the cam edge 100 will engage finger 87 to cause rod 77 to be drawn to the left a predetermined distance sufficient to bring the edges 64 of projections 62 into alignment with the rollers 42. All of the rollers thus will be in exact alignment to facilitate accurate adjustment of the cutting tools.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawing is to be interpreted as illustrative and not in a limiting sense.

Having thus described my invention, I claim as new and desire to secure by Letters Patent:

1. In a lathe, a base provided with a longitudinal bed, a carriage slidably mounted on said bed for longitudinal movement relative to said bed, a plurality of parallel slides slidably mounted on the carriage for movement at right angles to the axis of the lathe, a tool holder on each slide, a form cam fixed relative to the base, said slides having means to contact said form cam, means for moving said contact means into engagement with the form cam, means to cause said contact means to approach the form cam with a resultant movement at an inclination to the longitudinal axis of the form cam as the carriage is moved, said approach means comprising an approach cam lying alongside the form cam, the approach cam having a plurality of cam lugs to be engaged by the contact means on each slide, and each lug having an inclined cam edge crossing the cam edge of the form cam.

2. In a lathe, a base provided with a longitudinal bed, a carriage slidably mounted on said bed for longitudinal movement relative to said bed, a plurality of parallel slides slidably mounted on the carriage for movement at right angles to the axis of the lathe, a tool holder on each slide, a form cam fixed relative to the base, said slides having means to contact said form cam, means for moving said contact means into engagement with the form cam, means to cause said contact means to approach the form cam with a resultant movement at an inclination to the longitudinal axis of the form cam as the carriage is moved, said approach means comprising an approach cam lying alongside the form cam, the approach cam having a plurality of cam lugs to be engaged by the contact means on each slide, each lug having an inclined cam edge crossing the cam edge of the form cam, said form and approach cams having straight edges, a roller plate fixed to the carriage, and a plurality of rollers rotatably mounted on the roller plate and projecting therefrom and contacting said straight edges of said form and approach cams.

3. In a lathe, a base provided with a longitudinal bed, a carriage slidably mounted on said bed for longitudinal movement relative to said bed, a plurality of parallel slides slidably mounted on the carriage for movement at right angles to the axis of the lathe, a tool holder on each slide, a form cam fixed relative to the base, said slides having means to contact said form cam, means for moving said contact means into engagement with the form cam, means to cause said contact means to approach the form cam with a resultant movement at an inclination to the longitudinal axis of the form cam as the carriage is moved, said approach means comprising an approach cam lying alongside the form cam, the approach cam having a plurality of cam lugs to be engaged by the contact means on each slide, each lug having an inclined cam edge crossing the cam edge of the form cam, a tube fixed relative to the base of the lathe, a rod fixed to the approach cam and projecting into said tube, spring means within the tube to move the approach cam in one direction, and means on the carriage having a lost motion connection with the approach cam and adapted to contact the approach cam to move the same in an opposite direction against said spring means.

4. In a lathe, a base provided with a longitudinal bed, a carriage slidably mounted on said bed for longitudinal movement relative to said bed, a plurality of parallel slides slidably mounted on the carriage for movement at right angles to the axis of the lathe, a tool holder on each slide, a form cam fixed relative to the base, said slides having means to contact said form cam, means for moving said contact means into engagement with the form cam, means to cause said contact means to approach the form cam with a resultant movement at an inclination to the longitudinal axis of the form cam as the carriage is moved, said approach means comprising an approach cam lying alongside the form cam, the approach cam having a plurality of cam lugs to be engaged by the contact means on each slide, each lug having an inclined cam edge crossing the cam edge of the form cam, a tube fixed relative to the base of the lathe, a rod fixed to the approach cam and projecting into said tube, spring means within the tube to move the approach cam in one direction means on the carriage having a lost motion connection with the approach cam and adapted to contact the approach cam to move the same in an opposite direction against said spring means, and manual means to move the approach cam against the pressure of the spring means.

5. In a lathe, a base provided with a longitudinal bed, a carriage slidably mounted on said bed for longitudinal movement relative to said bed, a plurality of parallel slides slidably mounted on the carriage for movement at right angles to the axis of the lathe, a tool holder on each slide, a form cam fixed relative to the base, said slides having means to contact said form cam, means for moving said contact means into engagement with the form cam, means to cause said contact means to approach the form cam with a resultant movement at an inclination to the longitudinal axis of the form cam as the carriage is moved, said approach means comprising an approach cam lying alongside the form cam, the approach cam having a plurality of cam lugs to be engaged by the contact means on each slide, each lug having an inclined cam edge crossing the cam edge of the form cam, a tube fixed relative to the base of the lathe, a rod fixed to the approach cam and projecting into said tube, spring means within the tube to move the approach cam in one direction, means on the carriage having a lost motion connection with the approach cam and adapted to contact the approach cam to move the same in an opposite direction against said spring means, manual means to move the approach cam against the pressure of the spring means, and means to fix said form cam against movement longitudinally of the base.

6. A lathe comprising a base and a headstock, a tailstock on said base, said lathe being provided with a spindle, an arbor on said spindle to support a piece of stock, means on the tailstock to engage one end of the piece of stock, means to turn the stock, said means comprising a carriage slidably mounted on said base for longitudinal movement, a plurality of slides slidably mounted on the carriage for movement in a horizontal direction perpendicular to the axis of the spindle, a tool holder on each slide supporting a tool for turning the stock, means to control movement of the tools toward the stock, said means comprising a form cam extending longitudinally of the base, an approach cam extending longitudinally of the base and having cam portions crossing the cam edge of the form cam, means on each slide to engage one of the cam portions on the approach cam prior to contact with the cam edge of the form cam, means to fix said form cam against movement longitudinally of the base, means slidably mounting said approach cam for movement longitudinally of the base and carriage means to continuously urge said approach cam in one direction and means on said carriage engageable with said approach cam for moving said approach cam in a direction opposite to said first direction.

7. A lathe comprising a base and a headstock, a tailstock on said base, said lathe being provided with a spindle, an arbor on said spindle to support a piece of stock, means on the tailstock to engage one end of the piece of stock, means to turn the stock, said means comprising a carriage slidably mounted on said base for longitudinal movement, a plurality of slides slidably mounted on the carriage for movement in a horizontal direction perpendicular to the axis of the spindle, a tool holder on each slide supporting a tool for turning the stock, means to control movement of the tools toward the stock, said means comprising a form cam extending longitudinally of the base, an approach cam extending longitudinally of the base and having cam portions crossing the cam edge of the form cam, means on each slide to engage one of the cam portions on the approach cam prior to contact with the cam edge of the form cam, means to fix said form cam against movement longitudinally of the base, said approach cam being mounted for sliding movement longitudinally of the base and carriage, and means on the carriage to move said approach cam therewith.

8. In a lathe, a base, a carriage, means to mount the carriage for sliding movement on the base longitudinally of the axis of the lathe, a plurality of parallel slides slidably mounted on the carriage for horizontal movement in a direction perpendicular to the axis of the lathe, a tool holder on each slide, a vertical roller on each slide, a form cam fixed against longitudinal movement relative to the base, said rollers being adapted to contact the cam edge of said form cam; means to move said slides in a direction to bring said rollers into contact with the form cam, an approach cam alongside said form cam, and having cam means engageable by said rollers as said rollers approach the form cam, said form and approach cams having aligned straight rear edges, a roller plate fixed to the carriage, said roller plate being formed with aligned openings communicating with a surface of said roller plate, and rollers within said openings in the roller plate projecting beyond said surface of said roller plate, and contacting the straight edges of said form and approach cams.

9. In a lathe, a base, a carriage, means to mount the carriage for sliding movement on the base longitudinally of the axis of the lathe, a plurality of parallel slides slidably mounted on the carriage for horizontal movement in a direction perpendicular to the axis of the lathe, a tool holder on each slide, a vertical roller on each slide, a form cam fixed against longitudinal movement relative to the base, said rollers being adapted to contact the cam edge of said form cam, means to move said slides in a direction to bring said rollers into contact with the form cam, an approach cam alongside said form cam, and having cam means engageable by said rollers as said rollers approach the form cam, said form and approach cams having aligned straight rear edges, a roller plate fixed to the carriage, said roller plate being formed with aligned openings communicating with a surface of said roller plate, rollers within said openings in the roller plate projecting beyond said surface of said roller plate, and contacting the straight edges of said form and approach cams, and said carriage having a lost motion connection with said approach cam.

10. In a lathe, a base, a carriage, means to mount the carriage for sliding movement on the base longitudinally of the axis of the lathe, a plurality of parallel slides slidably mounted on the carriage for horizontal movement in a direction perpendicular to the axis of the lathe, a tool holder on each slide, a vertical roller on each slide, a form cam fixed against longitudinal movement relative to the base, said rollers being adapted to contact the cam edge of said form cam, means to move said slides in a direction to bring said rollers into contact with the form cam, an approach cam alongside said form cam, and having cam means engageable by said rollers as said rollers approach the form cam, said form and approach cams having aligned straight rear edges, a roller plate fixed to the carriage, said roller plate being formed with aligned openings communicating with a surface of said roller plate, rollers within said openings in the roller plate projecting beyond said surface of said roller plate, and contacting the straight edges of said form and approach cams, said carriage having a lost motion connection with said approach cam, means on said carriage to engage said approach cam to move the approach cam with the carriage in one direction, and spring means to move the approach cam in an opposite direction.

11. In a lathe, a base provided with a longitudinal bed, a carriage slidably mounted on said bed for longitudinal movement relative to said bed, a slide slidably mounted on a carriage for movement at right angles to the axis of the lathe, a tool holder on said slide, a form cam extending longitudinally of the bed and fixed relative to the base, said slide having means to contact said form cam, means for moving said contact means into engagement with said form cam, means to cause said contact means to approach the form cam with a resultant movement at an inclination to the longitudinal axis of the form cam as the carriage is moved, said approach means comprising an approach cam lying alongside the form cam, said approach cam being formed with a cammed lug to be engaged by the contact means on said slide, and said lug having an inclined cam edge crossing the cam edge of the form cam.

12. A lathe comprising a base, means thereon to support a piece of stock to be turned, means to turn said stock, said means comprising a carriage slidably mounted on said base for longitudinal movement, a plurality of slides slidably mounted on the carriage for movement in a horizontal direction perpendicular to the axis of the spindle, a tool holder on each slide supporting a tool for turning the stock, means to control movement of the tools toward the stock, said means comprising a form cam extending longitudinally of the base, an approach cam extending longitudinally of the base and having cam portions crossing the cam edge of the form cam, means on each slide to engage one of the cam portions on the approach cam prior to contact with the cam edge of the form cam, means to fix said form cam against movement longitudinally of the base, said approach cam being mounted for sliding movement longitudinally of the base and carriage, and means on the carriage to move said approach cam therewith.

SECONDO L. CASELLA.

REFERENCES CITED

The following references are of record in the file of this patent:

UNITED STATES PATENTS

| Number | Name | Date |
| --- | --- | --- |
| 671,806 | Robinson | Apr. 9, 1901 |
| 1,933,224 | Smith | Oct. 31, 1933 |

FOREIGN PATENTS

| Number | Country | Date |
| --- | --- | --- |
| 541,800 | Great Britain | Dec. 11, 1941 |
| 541,801 | Great Britain | Dec. 11, 1941 |
| 541,802 | Great Britain | Dec. 11, 1941 |